United States Patent [19]
Maeda

[11] Patent Number: 5,473,674
[45] Date of Patent: Dec. 5, 1995

[54] DATA COMMUNICATION APPARATUS HAVING AN AUTO-DIALING FUNCTION

[75] Inventor: Toru Maeda, Mitaka, Japan

[73] Assignee: Canon Kabushiki Kaisha, Tokyo, Japan

[21] Appl. No.: 48,525

[22] Filed: Apr. 20, 1993

[30] Foreign Application Priority Data

May 11, 1992 [JP] Japan .................................. 4-144822

[51] Int. Cl.⁶ .................................................. H04M 11/00
[52] U.S. Cl. ............................ 379/93; 379/100; 358/438; 358/434; 358/435; 358/436
[58] Field of Search ............................... 379/100, 92, 97, 379/98, 93, 216, 355, 356; 358/440, 434, 435, 436

[56] References Cited

U.S. PATENT DOCUMENTS 5,182,766  1/1993  Garland .................................. 379/216
5,241,587  8/1993  Horton et al. .......................... 379/92
5,287,402  2/1994  Nakajima ................................ 379/100

FOREIGN PATENT DOCUMENTS 4016042  1/1992  Japan ..................................... 379/355

Primary Examiner—Curtis Kuntz
Assistant Examiner—Stella L. Woo
Attorney, Agent, or Firm—Fitzpatrick, Cella, Harper & Scinto

[57]      ABSTRACT

A facsimile apparatus which has an auto-dialing function automatically begins a procedure for image communication after making a call to a destination. If the apparatus does not receive a response signal from the destination during predetermined period from the start of the procedure, the procedure is terminated. If a pause period is set into the auto-dialing operation, the apparatus automatically changes the predetermined period according to the set pause period, so that the apparatus with certainty receives the response signal from the destination by setting a long pause period into the auto-dialing operation.

12 Claims, 7 Drawing Sheets

DATA COMMUNICATION APPARATUS HAVING AN AUTO-DIALING FUNCTION

BACKGROUND OF THE INVENTION

1. Field of the Invention

The present invention relates to a data communication apparatus having an auto-dialing function.

2. Related Background Art

There is known a conventional facsimile apparatus that, in the case where the apparatus automatically effects image communication following an auto-dialing operation using an auto-dialing function, may need to set a pause period into the auto-dialing operation. The apparatus waits while the set pause period elapses after making a call to a destination, and the apparatus starts a procedure for image communication after the set pause period elapses.

FIG. 4 shows a sequence of the procedure when the pause period is set into the auto-dialing operation. The pause period is necessary for waiting for a telephone switching machine to connect a telephone line to the destination if the telephone switching machine spends a long time connecting the telephone line. In the case where the destination sends a message to the calling station in response to reception of a call, it is necessary that the pause period be set. One pause data P is set at the end of the telephone number, like setting the telephone number when the telephone number is registered into a one-touch dialing key (or an abbreviating dial key). The time corresponding to one pause data P is for example ten seconds. If a long pause period is necessary, plural pause data P may be set at the end of the telephone number, so that the pause period will be ten seconds times the number of pause data P. The apparatus discriminates if the pause data is set or not when the apparatus makes a call. If the pause data is set, the apparatus starts the procedure for image communication after the time corresponding to the set pause data has elapsed. In the procedure, the apparatus discriminates if a response signal is received from the destination or not while a fixed period T1 (i.e. thirty five seconds) elapses from starting the procedure. The fixed period T1 has been decided by the recommendation T30 defined by the CCITT (International Telephone & Telegraph Communication Committee).

If the response signal is not received during the fixed period the apparatus terminates the procedure for facsimile communication.

In the above described art, however, the telephone switching machine may connect the telephone line to the destination in a shorter time than the set pause period. Nevertheless, the apparatus always waits for the set pause period to elapse before it starts to effect the procedure and discriminate if the response signal is received or not. Therefore the start of image communication is delayed, as FIG. 5 shows.

As FIG. 6 shows, in the case where a longer pause period than the fixed period T1 is set into the auto-dialing operation and the telephone switching machine does not actually need such a long pause period to connect the telephone line to the destination, then the apparatus often terminates the procedure for image communication without completing the image communication. This is because the destination's facsimile apparatus starts its own procedure in response to receiving a call so that, when the apparatus (the calling side) starts its procedure and then waits too long in the pause period, the destination facsimile apparatus does not receive an expected signal and therefore terminates its procedure.

SUMMARY OF THE INVENTION

In consideration of the foregoing, an object of the present invention is to provide an improvement in this data communication apparatus.

Another object of the present invention is to provide a data communication apparatus capable of effecting image communication with certainty when a long pause period is set into the auto-dialing operation.

These and other objects are accomplished by providing a data communication apparatus comprising auto-dialing means for making a call to a destination in accordance with registered data in an auto-dialing operation, setting means for setting pause data into the registered data, and control means for discriminating if the pause data is set into the registered data or not, and starting to effect a procedure for data communication in response to finishing the auto-dialing operation, thereby not waiting a pause period corresponding to the set pause data to completely elapse, and changing a sequence of the procedure in accordance with the set pause data.

Still other objects of the present invention, and the advantages thereof, will become fully apparent from the following description of the embodiment to be taken in conjunction with the attached drawings.

DETAILED DESCRIPTION OF THE PREFERRED EMBODIMENT

Now the present invention will be clarified in detail by an embodiment thereof shown in the attached drawings.

Figure 1:
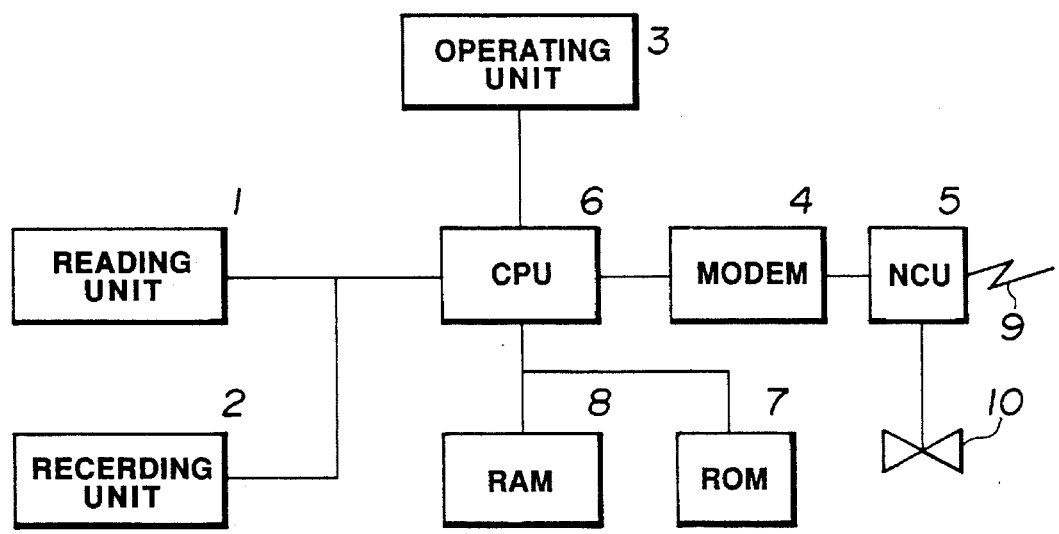
FIG. 1 is a schematic block diagram of a facsimile apparatus according to the present invention.

FIG. 1 is a block diagram which shows in outline the construction of a facsimile apparatus in the preferred embodiment. In FIG. 1, numeral 1 denotes a reading unit which electrically reads a document and output an electrical signal as an image signal. The reading unit 1 is composed of an image sensor (e.g. a charge coupled device), several kinds of electrical circuits (e.g. an analog-digital converter) and a mechanical organization for reading etc.

Numeral 2 denotes a recording unit which records an image corresponding to an image signal on a recording paper. For example the recording unit 2 is a thermal printer or an electrophotographic printer.

Numeral 3 denotes an operating unit which is used by an operator to enter different kinds of information (e.g. a telephone number, image communication mode etc.). The operating unit 3 is composed of plural kinds of keys (e.g.

one-touch dialing keys and a start key etc.), displaying devices (e.g. a liquid-crystal displaying device and a light emitting device) and a circuit for entering key inputs etc.

Numeral 4 denotes a modem which modulates a signal to be transmitted and demodulates a received signal from a telephone line 9.

Numeral 5 denotes a network control unit (NCU) which connects the telephone line 9 to the modem 4 or a telephone 10. NCU 5 is composed of a relay and a dialing circuit for sending a dialing signal to the telephone line 9 etc.

Numeral 6 denotes a control unit (CPU) which controls the entire facsimile operation (e.g. transmitting, receiving, an auto-dialing operation etc.) and which comprises a microcomputer.

Numeral 7 denotes a read only memory (ROM) into which programs for controlling the facsimile apparatus have been stored.

Numeral 8 denotes a random access memory (RAM) into which plural kinds of information, (for example, a telephone number data, a pause period data etc.) are stored.

Figure 2:
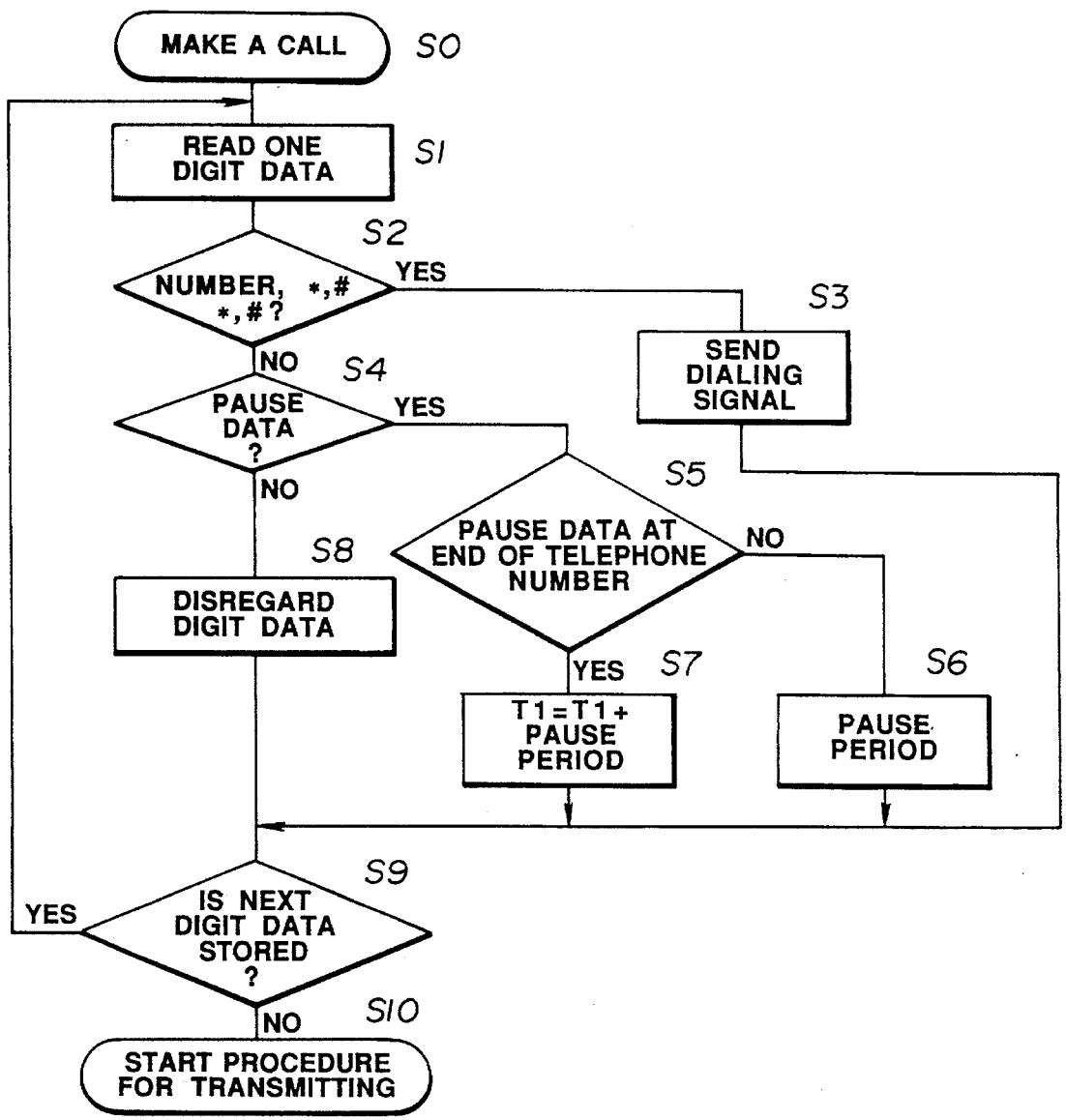
FIG. 2 is a flow chart showing the control operation effected by the CPU6 when the apparatus makes a call.

FIG. 2 is a flow chart showing the control operation effected by CPU 6 when the apparatus makes a call.

When the operator wishes to transmit a document by using the auto-dialing function, the operator sets the document into the reading unit 1 and pushes a one-touch dial key (or an abbreviated dial key). Then automatic transmission after auto-dialing is selected and the control operation showed by FIG. 2 is effected by CPU 6.

In step S1, CPU 6 reads one of the digit data of the registered data corresponding to the pushed one-touch dial key from RAM 8. In step S2, CPU 6 discriminates if the digit data is "*" or "#" or numerical data. If the read digit data is any of those kinds of data, CPU 6 causes the dialing circuit of NCU 5 to send a dialing signal corresponding to the read digit data in step S3. If the read digit data is not one of those kinds of data, CPU 6 discriminates if the read digit data is a pause data or not in step S4. If the read digit data is not the pause data, CPU 6 disregards the read digit data as insignificant data in step S8 and discriminates if a next digit data has been stored in RAM 8 in step S9. If the next digit data has been stored, CPU 6 returns from step S9 to step S1 for reading the next digit data. In step 4, if the read digit data is the pause data, CPU 6 discriminates if this pause data is at the end of the telephone number. Generally, specific data which indicates the end of the telephone number has been set at the end of the telephone number. In order to determine if the read pause data is at the end of the telephone number, CPU 6 discriminates if the specific data was read before the pause data or not. If the specific data was read before the pause data, CPU 6 discriminates that its pause data is set at the end of the telephone number. If the specific data was not read before the pause data, CPU 6 discriminates that its pause data is set between two of the digit data of the telephone number. Then in step S6, CPU 6 waits for a time corresponding to the set pause data and then CPU 6 shifts from step S6 to step S9 after the time corresponding to the set pause data has elapsed.

If its pause data is set at the end of the telephone number, CPU 6 adds a time corresponding to the set pause data into a timer T7 in step S7, and CPU 6 shifts from step S7 to step S9. The timer T7 is a timer for checking if the response signal from the destination is received or not, as in the above described related art.

The time corresponding to the pause data which is set in the middle of the telephone number is different from the time corresponding the pause data which is set at the end of the telephone data. The time corresponding to the pause data in the middle of the telephone number is, for example, two seconds, and the other time corresponding to the pause data is, for example, ten seconds.

Figure 7:
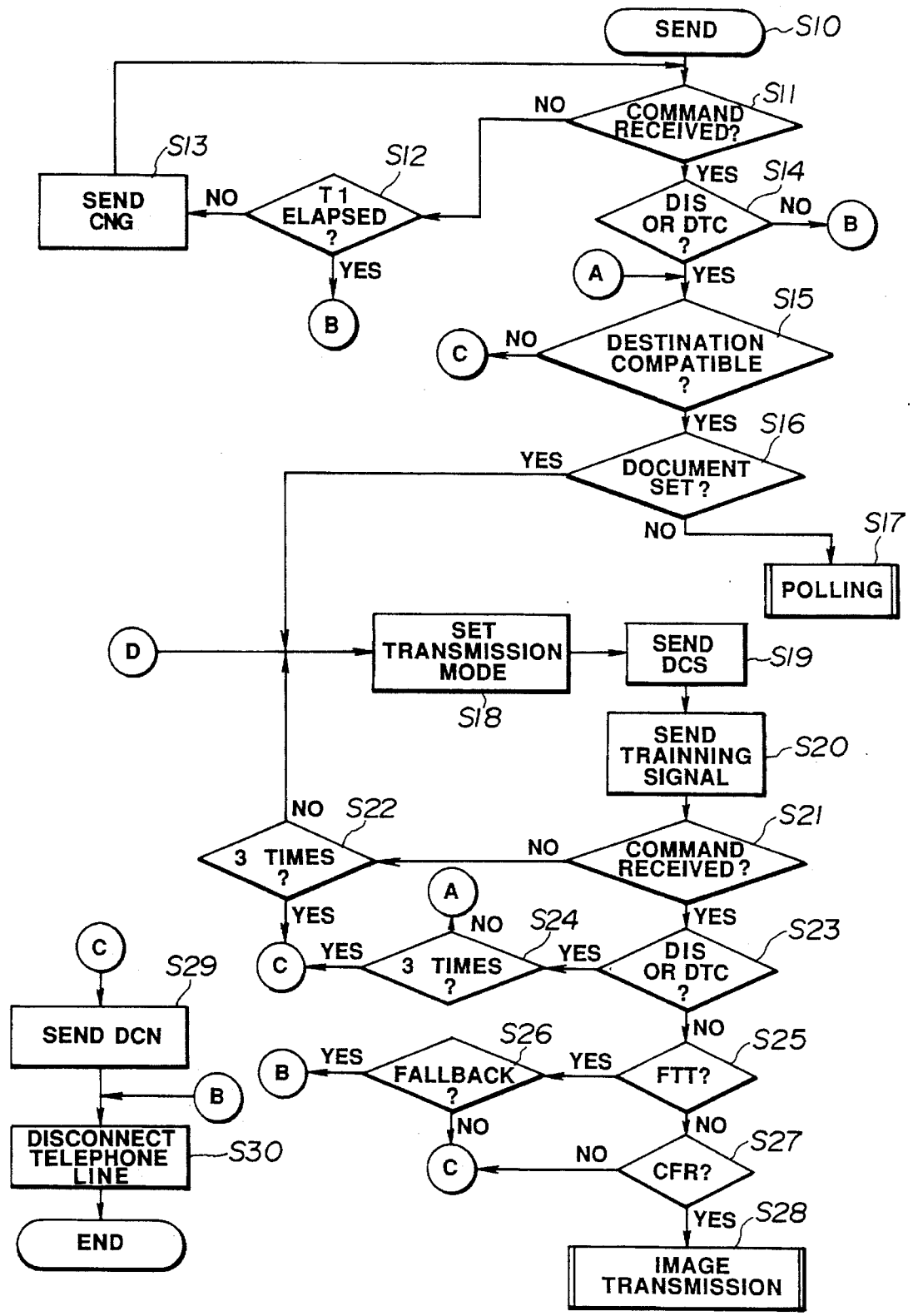
FIG. 7 is a flow chart showing a control operation effected by the CPU6 when the apparatus effects the facsimile communication.

In step S9, if CPU 6 has completed reading the registered data corresponding to the pushed dial key from RAM 8, CPU 6 starts a facsimile procedure for transmitting in step S10. FIG. 7 is a flow chart which shows a detail of the control operation for transmitting according to recommendation T30.

In step S10 of FIG. 7, CPU 6 starts the procedure for transmitting and starts the timer T7.

In the combination of step S11, step S12 and step S13, CPU 6 checks if a command is received or not from the destination and sends a CNG signal (a calling tone signal) to the telephone line 9 through modem 4 and NCU 5 during the time of the timer T7 from the start of the procedure. If the command is received during the time of timer T7, CPU 6 shifts from step S11 to step S14. If the command is not received during the time of timer T7, CPU 6 shifts from step S12 to step S30.

Then in step S30, CPU 6 causes NCU 5 to disconnect the telephone line 9 and terminates the procedure for transmitting.

In step S14, CPU 6 discriminates if the received command is DIS (Digital Identification Signal) or DTC (Digital Transmit Command). If the received command is either DIS or DTC, CPU 6 shifts from step S14 to step S30. If the received command is either DIS or DTC, CPU 6 discriminates if the destination's facsimile apparatus is compatible with its own facsimile apparatus in step S15. If the destination's apparatus is not compatible, CPU 6 shifts from step S15 to step S29 and sends DCN (Disconnect signal) to the telephone line 9 through the modem 4 and NCU 5 in step S29.

If the destination's apparatus is compatible, CPU 6 discriminates if a document is set or not into the reading unit 7 in step S16. If the document is set, CPU 6 shifts from step S16 to step S18. Then in step S18, CPU 6 sets a transmission mode able to effect image communication according to a function of its own facsimile apparatus and the received DIS. In step S19, CPU 6 sends DCS (Digital Command Signal) to the telephone line 9 through the modem 4 and NCU 5. In step S20, CPU 6 causes the modem 4 to send a training signal to the telephone line 9.

In the combination of step S18, step S19, step S20, step S21 and step S22, CPU 6 discriminates if a command is received or not from the destination while sending DCS and the training signal at intervals of about three seconds. If a command has not been received after three times of sending DSC, CPU 6 shifts from step S22 to step S29. If a command has been received during three times of sending DSC, CPU 6 shifts from step S21 to step S23.

In step S23, CPU 6 discriminates if the received command is either DIS or DTC. If so, CPU 6 discriminates in step S24 if DCS has been sent three times or not. If DCS has been sent three times, CPU 6 shifts from step S24 to step S29. If DCS has not been sent three times yet, CPU 6 shifts from step S24 to step S15. If the received command is neither DIS or DTC, CPU 6 Shifts from step S23 to step S25. In step S25, CPU 6 discriminates if the received command is FTT (Failure to Train) or not. If the received command is FTT, CPU 6 discriminates if CPU 6 effects a fallback process or terminates the procedure for transmitting in step S26. If CPU 6 effects a fallback process, CPU6 shifts from step S26 to step S18. If CPU terminates the procedure, CPU 6 shifts from step S26 to step S29.

In step S25, if the received command is not FTT, CPU 6 discriminates if the received command is CFR (Confirmation to Receive) or not in step S27. If the received command is not CFR, CPU 6 shifts from step S27 to step S29. If the received command is CFR, CPU 6 starts to transmit image data in the set transmission mode in step S28. Then after CPU 6 completes transmitting image data, CPU 6 effects a procedure for finishing the image transmission.

In step S16, if the document is not set into the reading unit 1, CPU 6 effects a procedure for polling in step S17.

As above described, if the pause data is set in the telephone number (at the end of the telephone number), CPU 6 changes the timer T7 according to the set pause data in step S27 of FIG. 2. Then, when CPU 6 finishes making a call to the destination, CPU 6 immediately starts a procedure for transmitting without waiting a pause period corresponding to the set pause data. Then in the procedure, CPU 6 discriminates if a command is received or not while the time of the changed timer T7 elapses from the start of the procedure.

Figure 3:
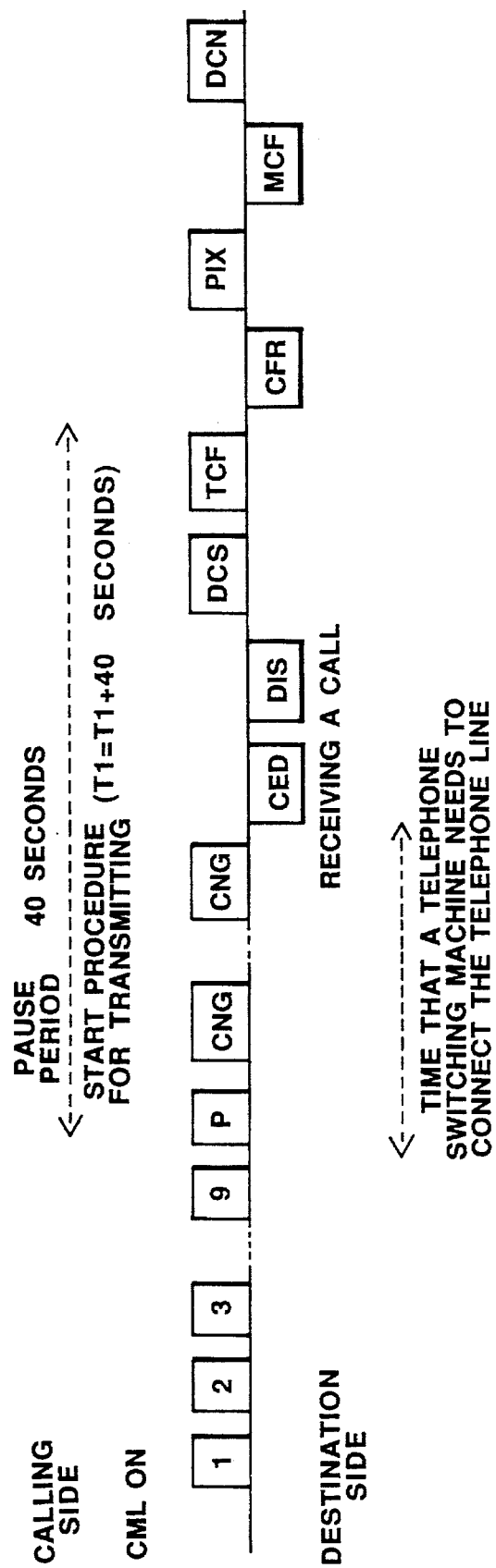
FIG. 3 is a view showing a sequence of facsimile communication effected by the facsimile apparatus according to the present invention.
Figure 4:
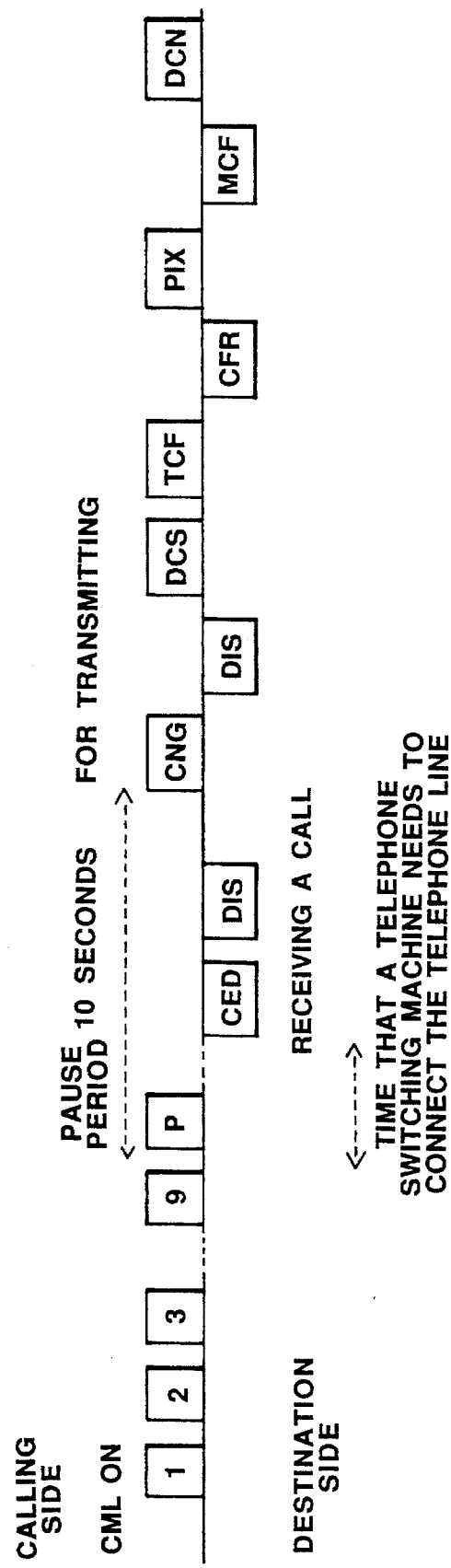
FIG. 4 is a view showing a sequence of facsimile communication according to the above described prior art.
Figure 5:
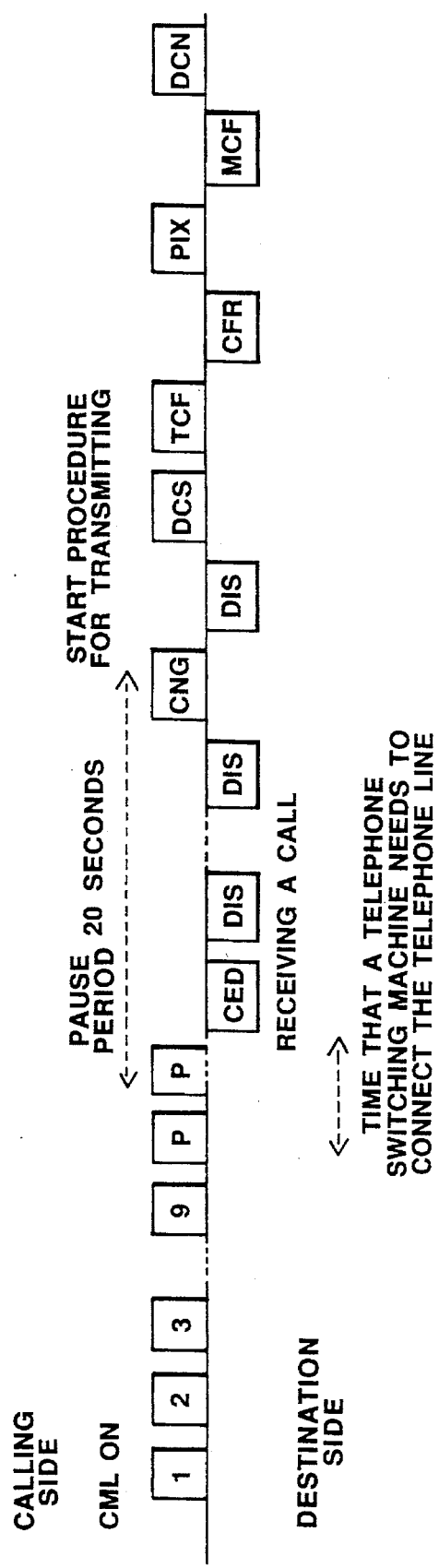
FIG. 5 is a view showing another sequence of facsimile communication according to the above described prior art.
Figure 6:
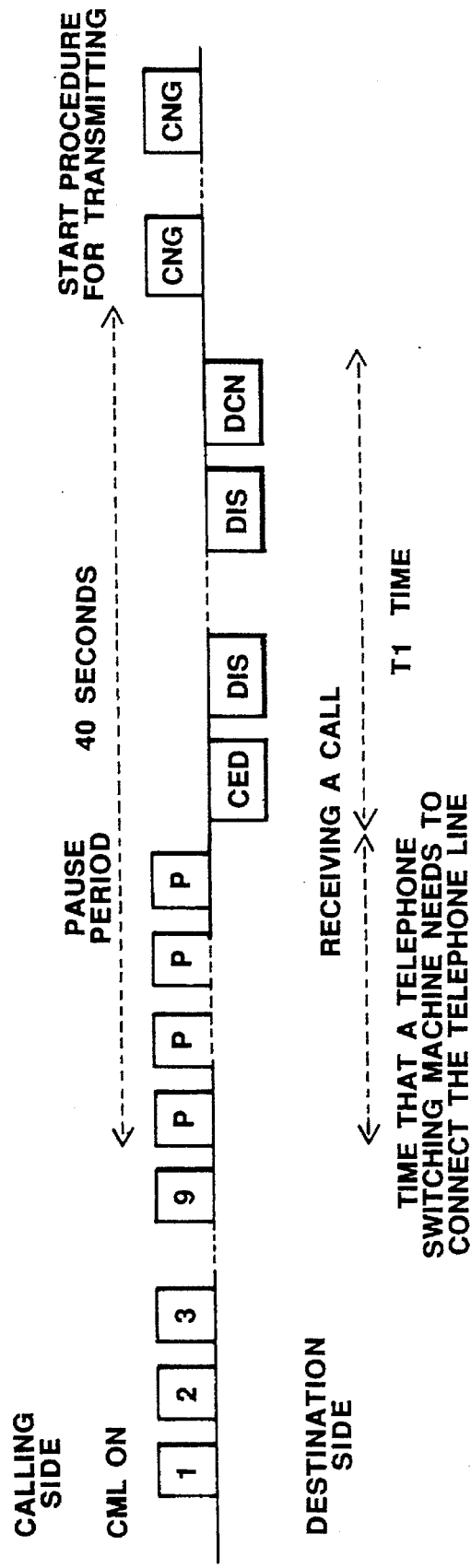
FIG. 6 is a view showing another sequence of facsimile communication according to the above described prior art.

FIG. 3 is a view showing a sequence of a facsimile communication effected by the facsimile apparatus according to the present invention. In FIG. 3, the pause data corresponding to forty seconds has been set in the telephone number and forty seconds has been added to the timer T7.

As shown by FIG. 3, the apparatus according to the present invention can with certainty receive a response signal (a command) from the destination because a time corresponding to the set pause data is added into the timer T7. The apparatus according to the present invention can effectively start transmitting image data without waiting for an unnecessary time when the destination's facsimile apparatus responds to a call during the pause period.

The foregoing embodiment has been given for an auto-dialing operation for transmitting image data, but the present invention is applicable to an auto-dialing operation for a polling reception. The foregoing embodiment has also been given for a facsimile apparatus, but the present invention is applicable to any data communication apparatus having an auto-dialing function capable of automatic transmission following to making a call, such as a teletex apparatus.

Also the present invention is not limited to the foregoing embodiment, but is subject to various modifications.

I claim:

1. A data communication apparatus having an auto-dialing function, comprising:

initiating means for initiating dialing to a destination called by the auto-dialing function in a dialing operation;

setting means for setting a pause data into a telephone number of the destination called by the auto-dialing function in the dialing operation;

changing means for changing a time which is used for checking whether a response signal has been received from the destination according to the set pause data; and control means for effecting a procedure for data communication in response to finishing the dialing operation, and discriminating if the response signal is received or not before the checking time from starting to effect the procedure has elapsed.

2. An apparatus according to claim 1, wherein the auto-dialing function has an abbreviated dial function, and said setting means sets the pause data in a telephone number registered in the abbreviated dial function.

3. An apparatus according to claim 1, wherein if the response signal is not received before the checking time has elapsed, said control means terminates the procedure for data communication.

4. A data communication apparatus comprising:

auto-dialing means for making a call to a destination, in accordance with a registered data, in an auto-dialing operation;

setting means for setting a pause data into the registered data; and control means for discriminating if the pause data is set into the registered data or not, starting to effect a procedure for data communication, having a sequence, in response to finishing the auto-dialing operation by said auto-dialing means, and changing the sequence of the procedure according to the set pause data, wherein said control means discriminates if a response signal is received from the destination or not before a time from starting to effect data communication has elapsed, and changes the time according to the set pause data.

5. A data communication apparatus comprising:

auto-dialing means for making a call to a destination in accordance with a registered data in an auto-dialing operation;

setting means for setting a pause data into the registered data; and control means for discriminating if the pause data is set into the registered data or not, starting to effect a procedure for data communication having a sequence in response to finishing the auto-dialing operation by said auto-dialing means, and changing the sequence of the procedure according to the set pause data, wherein said control means discriminates if a response signal is received from the destination or not before a time from starting to effect data communication has elapsed, and changes the time according to the set pause data, and, wherein said control means adds a time corresponding to the set pause data into a predetermined time in order to change the time for discriminating.

6. A data communication method using an auto-dialing operation, comprising the steps of:

discriminating if a pause data is set in the auto-dialing operation or not;

starting to immediately effect a procedure for data communication having a sequence in response to finishing the auto-dialing operation; and changing the sequence of the procedure according to the set pause data, wherein the procedure for data communication checks if a response signal from a destination is received or not before a predetermined time after the start of the procedure has elapsed, and said changing step changes the time in accordance with the set pause data.

7. A method according to claim 6, wherein the auto-dialing operation has an abbreviated dial key function, and the auto-dialing operation is started in response to an abbreviated dial key input.

8. A data communication method using an auto-dialing operation, comprising the steps of:

discriminating if a pause data is set in the auto-dialing operation or not;

starting to immediately effect a procedure for data communication having a sequence in response to finishing the auto-dialing operation; and changing the sequence of the procedure according to the set pause data, wherein the procedure for data communication checks if a response signal from a destination is received or not before a predetermined time after the start of the procedure has elapsed, and said changing step changes the time in accordance with the set pause data, and, wherein said changing step adds a pause period corresponding to the set pause data into the predetermined time.

9. A data communication apparatus having an auto-dialing function, comprising:

setting means for setting a pause data into a telephone number of a destination called by the auto-dialing function in a dialing operation;

changing means for changing a time which is used for checking whether a response signal has been received from the destination according to the set pause data; and control means for effecting a procedure for date communication in response to finishing the dialing operation, and discriminating if the response signal is received or not before the checking time for starting to effect the procedure has elapsed, wherein said changing means discriminates if the pause data set by said setting means is at an end of the telephone number or not, and changes the checking time according to the discrimination.

10. A data communication apparatus, comprising:

auto-dialing means for making a call to a destination in accordance with a registered data in an auto-dialing operation;

setting means for setting a pause data into the registered data; and control means for discriminating if the pause data is set into the registered data or not, starting to effect a procedure for data communication having a sequence in response to finishing the auto-dialing operation by said auto-dialing means, and changing the sequence of the procedure according to the set pause data, wherein said control means discriminates if the pause data is set or not set at an end of a telephone number of the registered data, and said control means changes the sequence of the procedure when the pause data is set at the end of the telephone number.

11. A data communication method using an auto-dialing operation, comprising the steps of:

discriminating if a pause data is set in the auto-dialing operation or not;

starting to immediately effect a procedure for data communication having a sequence in response to finishing the auto-dialing operation; and changing the sequence of the procedure according to the set pause data, wherein the auto-dialing operation is effected according to a registered telephone number, said discriminating step discriminates if the pause data is set at an end of the telephone number or not, and when the pause data is set at the end of the telephone number, said changing step changes the sequence of the procedure.

12. A method according to claim 11, wherein the pause data has been registered in a same manner as the telephone number.

* * * * *

UNITED STATES PATENT AND TRADEMARK OFFICE
CERTIFICATE OF CORRECTION

PATENT NO. : 5,473,674

DATED : December 5, 1995

INVENTOR(S): TORU MAEDA

It is certified that error appears in the above-identified patent and that said Letters Patent is hereby corrected as shown below:

On the Title page, Item [56];

REFERENCES CITED

Foreign Patent Documents, "4016042" should read --4-16042--.

COLUMN 2

Line 18, "waiting" should read --waiting out--; and

Line 54, "output" should read --outputs--.

COLUMN 3

Line 43, "step 4," should read --step S4,--.

COLUMN 5

Line 1, "CPU" (first occurrence) should read --CPU 6--; and

Line 18, "waiting" should read --waiting out--.

UNITED STATES PATENT AND TRADEMARK OFFICE
CERTIFICATE OF CORRECTION

PATENT NO. : 5,473,674

DATED : December 5, 1995

INVENTOR(S) : TORU MAEDA

It is certified that error appears in the above-identified patent and that said Letters Patent is hereby corrected as shown below:

<u>COLUMN 7</u>

Line 26, "date" should read --data--.

Signed and Sealed this

Fourteenth Day of May, 1996

Attest:

BRUCE LEHMAN

Attesting Officer　　　Commissioner of Patents and Trademarks